(12) United States Patent
Wei

(10) Patent No.: US 11,415,658 B2
(45) Date of Patent: Aug. 16, 2022

(54) DETECTION DEVICE AND METHOD FOR AUDIO DIRECTION ORIENTATION AND AUDIO PROCESSING SYSTEM

(71) Applicant: XSail Technology Co., Ltd, Guangdong (CN)

(72) Inventor: Qinghai Wei, Guangdong (CN)

(73) Assignee: XSail Technology Co., Ltd, Guangdong (CN)

( * ) Notice: Subject to any disclaimer, the term of this patent is extended or adjusted under 35 U.S.C. 154(b) by 243 days.

(21) Appl. No.: 16/914,463

(22) Filed: Jun. 28, 2020

(65) Prior Publication Data

US 2021/0223349 A1 Jul. 22, 2021

(30) Foreign Application Priority Data

Jan. 21, 2020 (CN) .......................... 202010071344.7

(51) Int. Cl.
*G01S 3/80* (2006.01)
*G01S 3/86* (2006.01)
*G10L 21/0216* (2013.01)
*H04R 3/00* (2006.01)

(52) U.S. Cl.
CPC .............. *G01S 3/8006* (2013.01); *G01S 3/86* (2013.01); *G10L 21/0216* (2013.01); *H04R 3/005* (2013.01); *G10L 2021/02166* (2013.01)

(58) Field of Classification Search
CPC ....... G10L 2021/02166; G10L 21/0216; G01S 3/8006; G01S 3/86; H04R 3/005
See application file for complete search history.

(56) References Cited

U.S. PATENT DOCUMENTS

| 9,595,997 | B1* | 3/2017 | Yang | ..................... H04M 9/082 |
| 9,685,171 | B1* | 6/2017 | Yang | ................... G10L 21/0208 |
| 9,813,808 | B1 | 11/2017 | Yang | |
| 2012/0027219 | A1* | 2/2012 | Kale | ..................... H04R 3/005 |
| | | | | 381/71.1 |
| 2014/0003635 | A1* | 1/2014 | Mohammad | ........... G10K 11/16 |
| | | | | 381/306 |
| 2014/0006017 | A1* | 1/2014 | Sen | .......................... H04S 7/30 |
| | | | | 704/226 |
| 2019/0103113 | A1* | 4/2019 | LaBosco | ............. G10L 21/0208 |

(Continued)

FOREIGN PATENT DOCUMENTS

DE 102018109247 A1 * 12/2018 ............. H04R 1/406

*Primary Examiner* — Mohammad K Islam
(74) *Attorney, Agent, or Firm* — JCIPRNET

(57) ABSTRACT

A detection device and a method for audio direction orientation and an audio processing system are provided. The device includes a first filter, which performs a first infinite impulse response operation on each first audio beam to generate second audio beams; an absolute value operator which performs an absolute value operation on amplitude of each second audio beam to generate third audio beams; a second filter which performs a second infinite impulse response operation on each third audio beam to smooth each third audio beam to generate fourth audio beams; and a DOA processor which divides the fourth audio beams into audio beam groups, and selects a selected audio beam from each audio beam group according to energy of each fourth audio beam in each audio beam group to output beam information corresponding to the selected audio beams and used in a speech recognition and for determining a voice direction.

17 Claims, 7 Drawing Sheets

(56) References Cited

U.S. PATENT DOCUMENTS

2019/0385635 A1\* 12/2019 Shahen Tov ............ G10L 25/21
2020/0279557 A1\*  9/2020 Li ........................ G10L 21/0208
2020/0387341 A1\* 12/2020 Robinson ............ G06F 21/6245

\* cited by examiner

DETECTION DEVICE AND METHOD FOR AUDIO DIRECTION ORIENTATION AND AUDIO PROCESSING SYSTEM

CROSS-REFERENCE TO RELATED APPLICATION

This application claims the priority benefit of China application serial no. 202010071344.7, filed on Jan. 21, 2020. The entirety of the above-mentioned patent application is hereby incorporated by reference herein and made a part of this specification.

TECHNICAL FIELD

The invention relates to an audio processing technology, and more particularly, to a detection device and method for audio direction orientation and an audio processing system.

BACKGROUND

Speech recognition technology is one of the current popular technologies that automatically convert human speech content into corresponding text. With the development of technology and the popularization of the Internet, speech recognition systems have been widely used in many electronic devices such as portable devices to achieve functions such as voice dialing, voice navigation, indoor device control, or voice file retrieval.

However, when a speech recognition system obtains a sound source signal, it will inevitably be interfered by factors such as environmental noise, reverberation, echo, and speech from the others. These factors will seriously affect the accuracy of the speech recognition. Accordingly, how to solve the aforementioned problems has become one of important issues in the related art.

SUMMARY

The invention provides a detection device and method for audio direction orientation and an audio processing system, which can suppress noise and retrieve a pure sound source signal through a positioning technology for audio direction, so as to improve the accuracy of the speech recognition.

The invention discloses a detection device for audio direction orientation (a.k.a. a DOA detection device). The DOA detection device for audio includes a first filter, an absolute value operator, a second filter and a DOA processor. The first filter receives a plurality of first audio beams and performs a first infinite impulse response operation on each of the first audio beams to generate a plurality of second audio beams. The absolute value operator is coupled to the first filter, and the absolute value operator performs an absolute value operation on amplitude of each of the second audio beams to generate a plurality of third audio beams. The second filter is coupled to the absolute value operator, and the second filter performs a second infinite impulse response operation on each of the third audio beams to smooth each of the third audio beams to generate a plurality of fourth audio beams. The DOA processor is coupled to the second filter. The DOA processor divides the fourth audio beams into a plurality of audio beam groups, and selects a selected audio beam from each of the audio beam groups according to energy of each of the fourth audio beams in each of the audio beam groups to output beam information corresponding to the selected audio beams. The beam information are used in a speech recognition and for determining a voice direction.

The invention discloses an audio processing system. The audio processing system includes a noise cancellation device, a beamforming device, a DOA device and a speech recognizer. The noise cancellation device receives microphone information and speaker play information, and sequentially performs a filtering operation, a sample rate converting operation and an echo cancelling operation on the microphone information and the speaker play information to generate echo-cancelled audio data. The beamforming device is coupled to the noise cancellation device to generate a plurality of first audio beams according to the echo-cancelled audio data. The DOA detection device receives the first audio beams, sequentially performs a first infinite impulse response operation, an absolute value operation and a second infinite impulse response operation on the first audio beams to generate a plurality of processed audio beams, and selects a part of the processed audio beams to generate a plurality of beam information. The beam information correspond to at least one specific direction. The speech recognizer is coupled to the DOA detection device, and the speech recognizer performs a speech recognition and determines a voice direction according to the beam information.

The invention discloses a method for audio direction orientation. The method for audio direction orientation includes the following steps. A plurality of first audio beams are received and a first infinite impulse response operation is performed on each of the first audio beams to generate a plurality of second audio beams. An absolute value operation is performed on amplitude of each of the second audio beams to generate a plurality of third audio beams. A second infinite impulse response operation is performed on each of the third audio beams to smooth each of the third audio beams to generate a plurality of fourth audio beams. Then, the fourth audio beams are divided into a plurality of audio beam groups, and a selected audio beam is selected from each of the audio beam groups according to energy of each of the fourth audio beams in each of the audio beam groups so as to output beam information corresponding to the selected audio beams. The beam information are used in a speech recognition and for determining a voice direction.

Based on the above, according to the embodiments of the invention, the audio information are received from the microphones in the microphone array, subsequent operations of the audio processing system are activated when determining that the human voice is included in the microphone information, and multiple infinite impulse response operations are used in the subsequent operations to accurately obtain the voice source direction from the audio beams corresponding to the microphone information. The subsequent operations also include noise and echo cancellation for the microphone information and the speaker play information. In this way, the audio processing system can suppress noise and extract the pure sound source signal according to the above method, so as to improve the accuracy of the speech recognition. In addition, most of the audio processing system of this embodiment can be implemented by hardware, which does not occupy CPU resources while ensuring performance.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
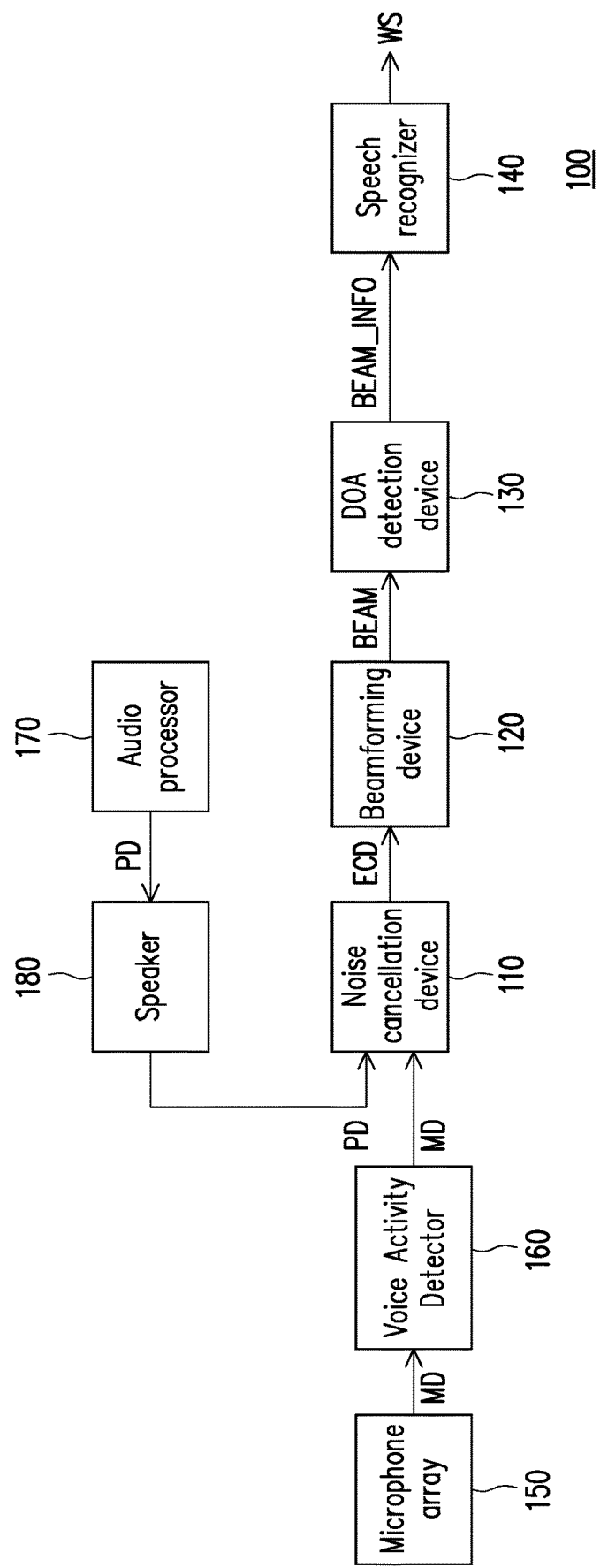
FIG. 1 is a block diagram of an audio processing system illustrated according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of an audio processing system illustrated according to an embodiment of the invention. Referring to FIG. 1, an audio processing system 100 mainly includes a noise cancellation device 110, a beamforming device 120, a DOA (Direction Of Arrival) detection device 130 and a speech recognizer 140. The beamforming device 120 is coupled to the noise cancellation device 110. The DOA detection device 130 is coupled to the beamforming device 120. The speech recognizer 140 is coupled to the DOA detection device 130. The audio processing system 100 of this embodiment is implemented by a smart speaker or a related consumer electronic device.

In this embodiment, the noise cancellation device 110 receives microphone information MD and speaker play information PD, and sequentially performs a filtering operation, a sample rate converting operation and an echo cancelling operation on the microphone information MD and the speaker play information PD to generate echo-cancelled audio data ECD. That is to say, the noise cancellation device 110 is used for canceling noise and echo. In an embodiment, what the echo referred to herein may also be self-noise generated from a speaker 180, which is not particularly limited in the invention. A detailed operation mode of the noise cancellation device 110 will be further described with reference to FIG. 2.

The beamforming device 120 receives the echo-cancelled audio data ECD, and generates a plurality of audio beams BEAM according to the echo-cancelled audio data ECD. Accordingly, since the noise cancellations device 110 may be provided with a finite impulse response filter, the beamforming device 120 and the noise cancellation device 110 may realize a filtering and beam forming (FSB) function together. That is to say, the beamforming device 120 of this embodiment may not be provided with a filtering function. A detailed operation mode of the beamforming device 120 will be further described with reference to FIG. 3.

The DOA detection device 130 receives the audio beams BEAM, sequentially performs a first infinite impulse response operation, an absolute value operation and a second infinite impulse response operation on the audio beams BEAM to generate a plurality of processed audio beams, and selects a part of the processed audio beams from the processed audio beams to generate a plurality of beam information BEAM_INFO. It should be noted that, the beam information BEAM_INFO correspond to at least one specific direction. Therefore, the DOA detection device 130 may output multiple sound sources and direction information of each sound source. A detailed operation mode of the DOA detection device 130 will be further described with reference to FIG. 4.

Lastly, the speech recognizer 140 receives the beam information BEAM_INFO, performs a speech recognition and determines a voice direction according to the beam information BEAM_INFO, so as to convert speech content from the sound source into a corresponding voice command signal WS for outputting.

Figure 5:
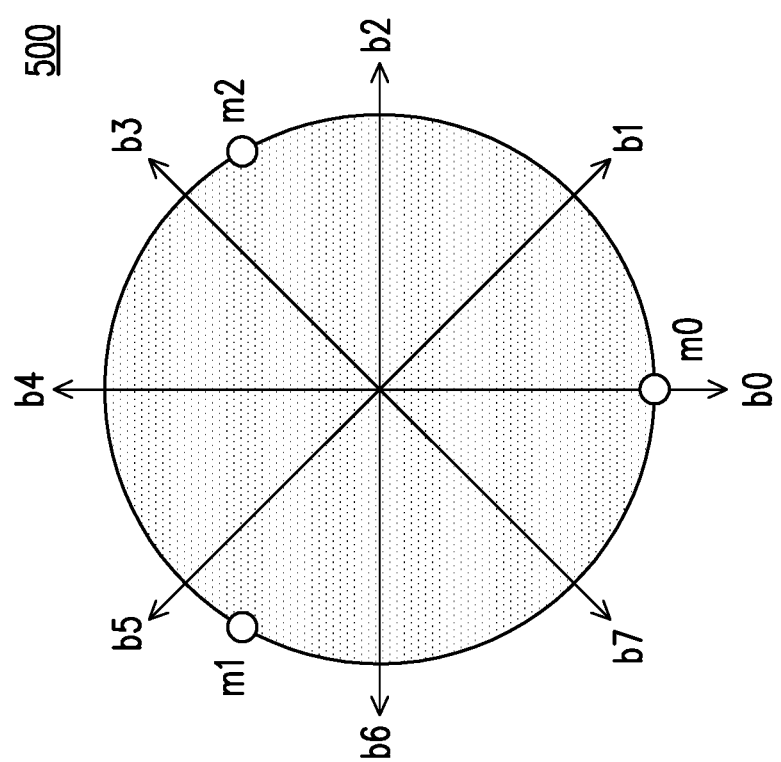
FIG. 5 is an example of a microphone array illustrated according to an embodiment of the invention.

In an embodiment, the audio processing system 100 further includes a microphone array 150, and the microphone array 150 is coupled to the noise cancellation device 110. The microphone array 150 includes a plurality of microphones which are spatially separated (e.g., a microphone array composed of 3 microphones, as shown in FIG. 5). The system may support 1 to 8 microphones, and may support arrays arranged in circular or linear manners. The number and arrangement manner of the microphones in the microphone array 150 is not particularly limited in the present embodiment of the invention, which may be adaptively adjusted by those applying the present embodiment. Each microphone generates audio information, and the microphone information MD includes the audio information of each microphone. In another embodiment, the audio processing system 100 further includes a voice activity detector (VAD) 160, and the voice activity detector 160 is coupled between the microphone array 150 and the noise cancellation device 110. The voice activity detector 160 determines whether a human voice is included in the microphone information MD. Further, the voice activity detector 160 activates the noise cancellation device 110 when determines that the human voice is included in the microphone information MD, and transmits the microphone information MD to the noise cancellation device 110 for the audio processing system 110 to perform the speech recognition and determine the voice direction. On the other hand, when determining that the human voice is not included in the microphone information MD, the voice activity detector 160 turns off the noise cancellation device 110 and subsequent related components to achieve a power saving function.

In an embodiment, the audio processing system 100 further includes an audio processor 170 and the speaker 180. The speaker 180 is coupled to the audio processor 170. The audio processor 170 generates the speaker play information PD, and the speaker 180 plays audio according to the speaker play information PD. It is worth noting that, because the audio processing system 100 may be implemented as a smart speaker and the speaker play information PD is the audio information of a play channel of the device itself, the audio information needs to be retrieved to eliminate an audio interference from the device itself.

Figure 2:
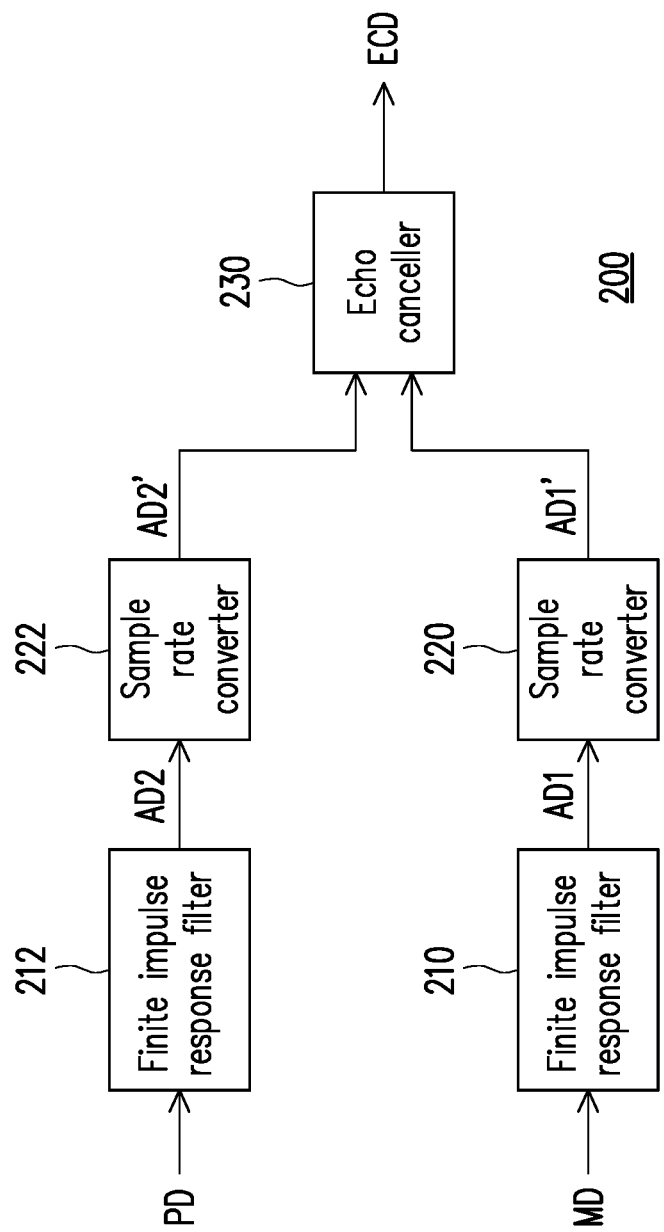
FIG. 2 is a detailed block diagram of a noise cancellation device illustrated according to an embodiment of the invention.

FIG. 2 is a detailed block diagram of a noise cancellation device illustrated according to an embodiment of the invention. A noise cancellation device 200 of the present embodiment is used to further describe the detailed operation mode of the noise cancellation device 110 of FIG. 1. Referring to FIG. 2, the noise cancellation device 200 includes a finite impulse response filter 210, a finite impulse response filter 212, a sample rate converter 220, a sample rate converter 222 and an echo canceller 230. The sample rate converter 220 is coupled to the finite impulse response filter 210. The sample rate converter 222 is coupled to the finite impulse response filter 212. The echo canceller 230 is coupled to the sample rate converter 220 and the sample rate converter 222.

In this embodiment, the finite impulse response filter 210 receives and then converts the microphone information MD into audio data AD1, and the sample rate converter 220 converts the audio data AD1 into audio data AD1' conforming a sample rate (e.g., 16 KHz). Further, the finite impulse response filter 212 receives and converts the speaker play information PD into audio data AD2, and the sample rate converter 222 converts the audio data AD2 into audio data AD2' conforming the sample rate (e.g., 16 KHz). Lastly, the echo canceller 230 performs an echo cancellation on the audio data AD1' according to the audio data AD2' so as to generate the echo-cancelled audio data ECD.

In this way, the finite impulse response filter 210, the finite impulse response filter 212, the sample rate converter 220 and the sample rate converter 222 accomplish a low distortion sample rate conversion so subsequent modules may work at a designated sample rate (e.g., 16 KHz). In addition, the echo canceller 230 receives two sorts of data from the play channel and the microphone channel and performs the echo cancellation.

Figure 3:
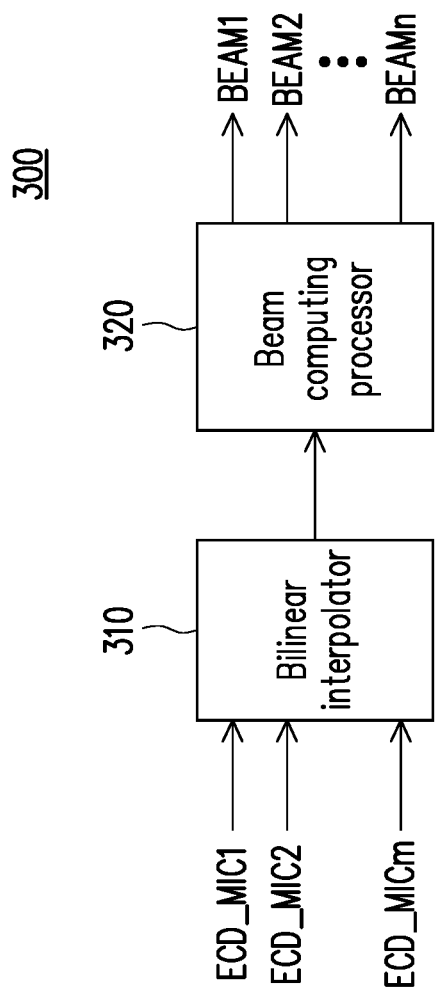
FIG. 3 is a detailed block diagram of a beamforming device illustrated according to an embodiment of the invention.

FIG. 3 is a detailed block diagram of a beamforming device illustrated according to an embodiment of the invention. A beamforming device 300 of the present embodiment is used to further describe the detailed operation mode of the beamforming device 120 of FIG. 1. Referring to FIG. 3, the beamforming device 300 includes a bilinear interpolator 310 and a beam computing processor 320. The beam computing processor 320 is coupled to the bilinear interpolator 310.

In this embodiment, the bilinear interpolator 310 delays each of echo-cancelled audio information ECD_MIC1 to ECD_MICm of the microphones in the microphone information so that the echo-cancelled audio information ECD_MIC1 to ECD_MICm are aligned according to an information waveform. Next, based on a filtering and beam forming algorithm, the beam computing processor 320 generates a plurality of audio beams BEAM1 to BEAMn according to a plurality of delayed audio information. For example, m may be 8 and n may be 32. That is to say, input of 8 microphones and output of 32 beams may be supported, but the invention is not limited thereto.

In certain embodiments, the beam computing processor 320 may also generate the audio beams BEAM1 to BEAMn by using other beamforming algorithms, which are not particularly limited by the invention.

Figure 4:
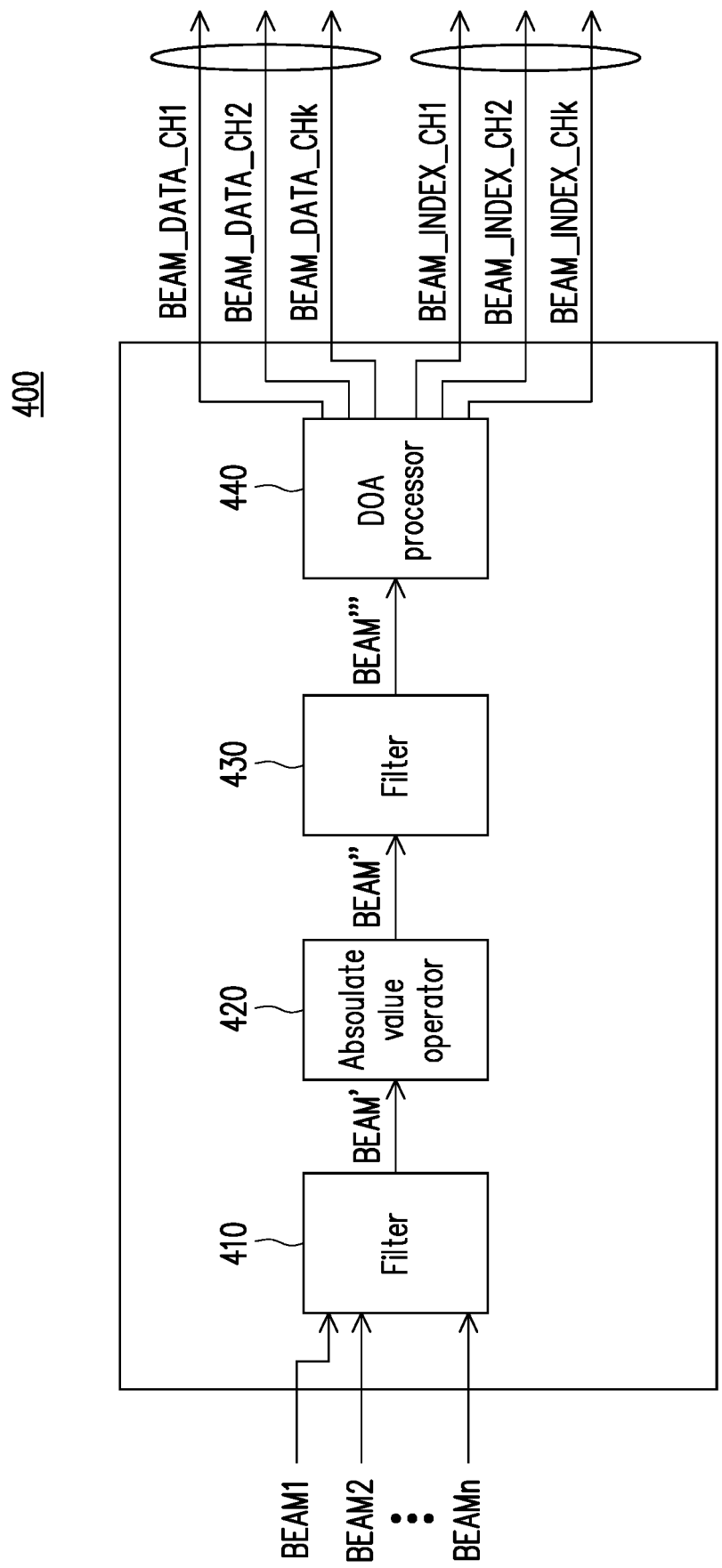
FIG. 4 is a detailed block diagram of a DOA detection device illustrated according to an embodiment of the invention.

FIG. 4 is a detailed block diagram of a DOA detection device illustrated according to an embodiment of the invention. A DOA detection device 400 of the present embodiment is used to further describe the detailed operation mode of the DOA detection device 130 of FIG. 1. Referring to FIG. 4, the DOA detection device 400 includes a filter 410, an absolute value operator 420, a filter 430 and a DOA processor 440. The absolute value operator 420 is coupled to the filter 410. The filter 430 is coupled to the absolute value operator 420. The DOA processor 440 is coupled to the second filter 430.

In this embodiment, the filter 410 receives a plurality of audio beams BEAM1 to BEAMn and performs a first infinite impulse response operation on each of the audio beams BEAM1 to BEAMn to generate a plurality of audio beams BEAM1'~BEAMn' (which are represented only by BEAM' in FIG. 4). It should be noted that, the reason why the filter 410 performs the first infinite impulse response operation on each of the audio beams BEAM1 to BEAMn is to select audio data in a human voice frequency band, and reduce an interference of noise in a non human voice frequency band on speech information. The first infinite impulse response operation is, for example, a second order IIR operation.

Next, the absolute value operator 420 receives the audio beams BEAM', and performs the absolute value operation on amplitude of each of the audio beams BEAM' to generate a plurality of audio beams BEAM1" to BEAMn" (which are represented only by BEAM" in FIG. 4). It should be noted that, the absolute value operator 420 performs the absolute value operation on amplitude of each of the audio beams BEAMn' to thereby reduce an operational complexity.

Furthermore, the filter 430 receives the audio beams BEAM", and performs a second infinite impulse response operation on each of the audio beams BEAM" to smooth each of the audio beams BEAM", so as to generate a plurality of audio beams BEAM1''' to BEAMn''' (which are represented only by BEAM''' in FIG. 4). It is worth noting that, the filter 430 may perform a low pass filtering to smooth an envelope of each of the audio beams BEAM" to prevent the DOA processor 440 from constantly selecting the adjacent audio beam BEAM''' when selecting and determining the voice direction. The second infinite impulse response operation is, for example, a first order IIR operation. In certain embodiments consistent with the invention, an order of the first infinite impulse response (e.g., the second order IIR) operation is greater than an order of the second infinite impulse response (e.g., the first order IIR) operation.

The DOA processor 440 receives the audio beams BEAM''', divides the audio beams BEAM''' into a plurality of audio beam groups, and selects a selected audio beam from each of the audio beam groups according to energy of each of the audio beams BEAM''' in each of the audio beam groups to output beam information corresponding to the selected audio beams. The beam information are used in a speech recognition and for determining a voice direction. Specifically, the DOA processor 440 selects an envelope of each of the audio beams BEAM''' having the largest amplitude (i.e., having the highest energy) in each of the audio beam groups as the selected audio beam. In addition, each of the audio beam groups corresponds to a channel. The beam information include output beam channel data (DATA) of the channel and an output beam channel index (INDEX) of the channel. The output beam channel data is used in the speech recognition to obtain at least one speech information. The output beam channel index is used for determining a transmission direction corresponding to the at least one speech information.

For instance, the DOA processor 440 divides the received audio beams BEAM1''' to BEAMn''' evenly into k groups (k is an integer, such as 4). Each audio beam group is processed separately and one audio beam having the highest energy in each group is selected as one channel output. Output information include output beam channel data BEAM_DATA_CH1 to BEAM_DATA_CHk used in the speech recognition and output beam channel indexes BEAM_INDEX_CH1 to BEAM_INDEX_CHk for determining a sound source direction. By using the method of dividing the audio beams into groups and selecting one having the highest energy in each group, the DOA processor 440 of the present embodiment may effectively extract the audio information and the direction information corresponding to each sound source for the case of a single sound source or multiple sound sources.

It is worth noting that the purpose of performing a first order filter filtering operation is to extract the envelope of the audio data for a smoothing process. Because amplitude of the sound is constantly changing, after the smoothing process, a continuous jumping may be avoided when the sound source direction is selected between adjacent samples. The DOA detection device 400 finally determines, according to amplitude of the processed audio data, which audio beam in the current audio beam group is the sound source and outputs the audio information and the direction information thereof to achieve a multiple sound source separation and extraction.

FIG. 5 is an example of a microphone array illustrated according to an embodiment of the invention. Referring to FIG. 5, taking a circular array 500 of 3 microphones and 8 beams as an example, m0 to m2 are positions of the 3 microphones, and b0 to b7 are directions of the 8 beams. The invention is a hardware system for realizing a speech enhancement and a sound source direction measurement based on the microphone array.

Figure 6:
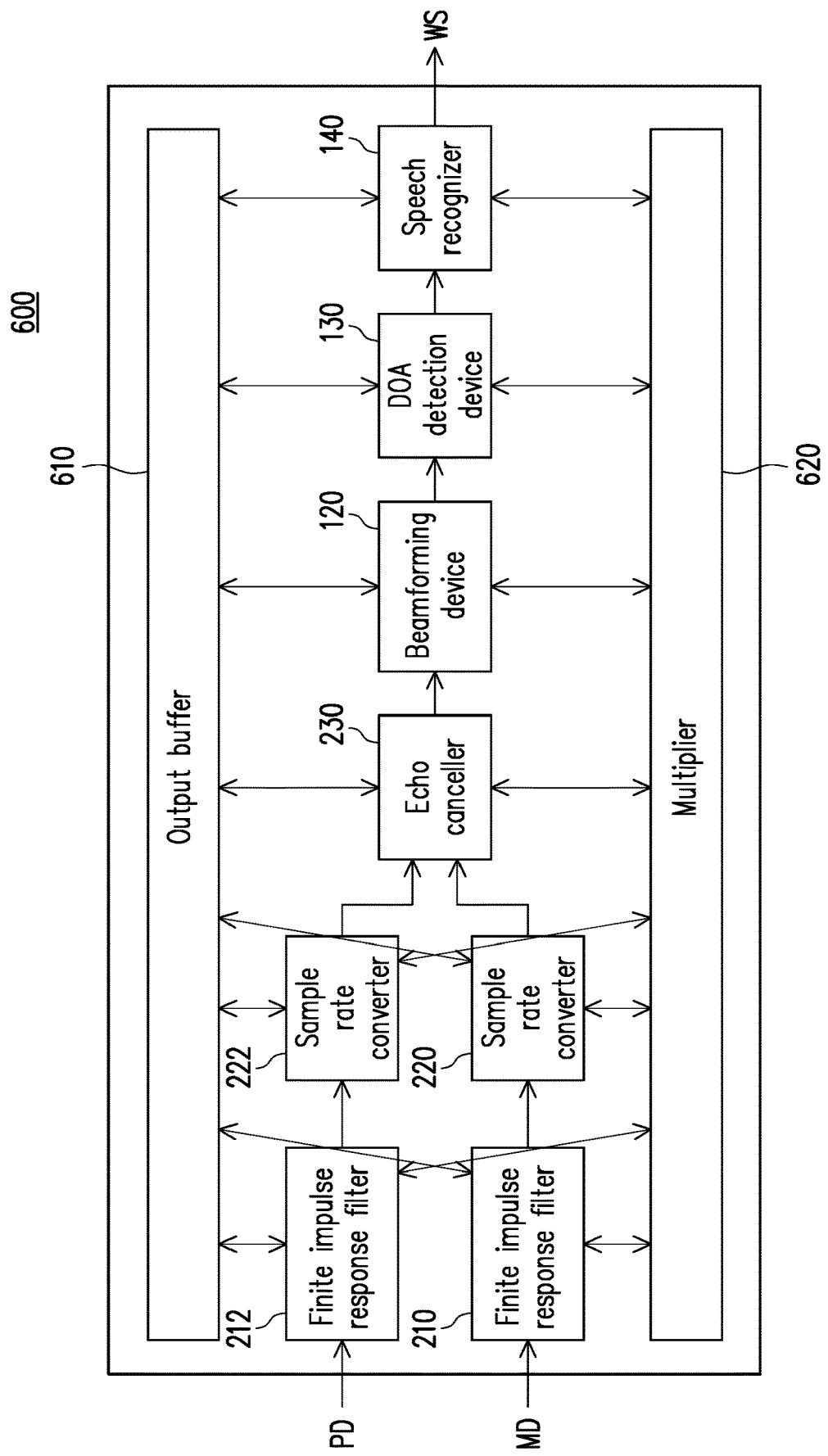
FIG. 6 is a block diagram of an audio processing system illustrated according to another embodiment of the invention.

FIG. 6 is a block diagram of an audio processing system illustrated according to another embodiment of the invention. An audio processing system 600 of the present embodiment is used to further describe the detailed operation mode of the audio processing system 100 of FIG. 1. Referring to FIG. 6, the audio processing system 600 further includes an output buffer 610. The finite impulse response filter 210, the sample rate converter 220, the finite impulse response filter 212, the sample rate converter 222, the echo canceller 230, the beamforming device 120, the DOA detection device 130 and the speech recognizer 140 share use of the output buffer 610. For instance, the finite impulse response filter 210 writes the processed data into the output buffer 610. When the sample rate converter 220 works, the data being written into the output buffer 610 by the finite impulse response filter 210 is directly read from the output buffer 610, processed, and written into the output buffer 610 again to be used by subsequent modules. In this way, all the modules can share use of one single output buffer 610. In an embodiment, the output buffer 610 is, for example, a static random access memory (SRAM), but the invention is not limited thereto.

In an embodiment, the audio processing system 600 further includes a multiplier 620. The finite impulse response filter 210, the first sample rate converter 220, the finite impulse response filter 212, the sample rate converter 222, the echo canceller 230, the beamforming device 120, the DOA detection device 130 and the speech recognizer 140 share use of the multiplier 620 in a pipeline arrangement manner (i.e., perform operations by using the multiplier 620 in sequence).

Figure 7:
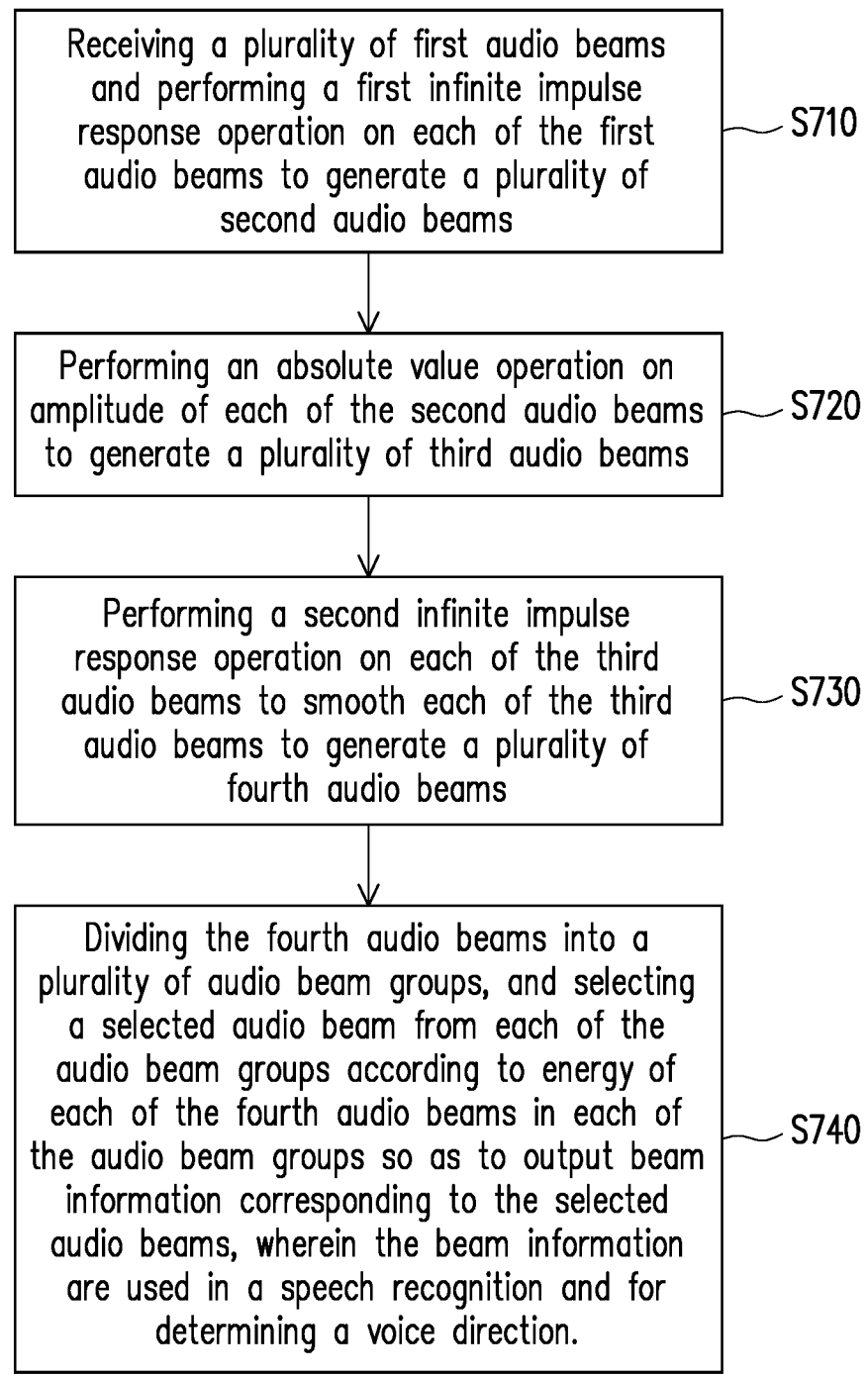
FIG. 7 is a flowchart of a method for audio direction orientation for audio illustrated according to an embodiment of the invention.

FIG. 7 is a flowchart of a method for audio direction orientation for audio illustrated according to an embodiment of the invention. Referring to the DOA detection device 400 of FIG. 4 and a flowchart 700 of FIG. 7 together, In step S710, the filter 410 of the DOA detection device 400 receives a plurality of audio beams BEAM1 to BEAMn and performs a first infinite impulse response operation on each of the audio beams BEAM1 to BEAMn to generate a plurality of audio beams BEAM'. In step S720, the absolute value operator 420 performs an absolute value operation on amplitude of each of the audio beams BEAM' to generate a plurality audio beams BEAM". In step S730, the filter 430 performs a second infinite impulse response operation on each of the audio beams BEAM" to smooth each of the audio beams BEAM" to generate a plurality of audio beams BEAM'''. In step S740, the DOA processor 440 divides the audio beams BEAM''' into a plurality of audio beam groups, and selects a selected audio beam from each of the audio beam groups according to energy of each of the fourth audio beams BEAM''' in each of the audio beam groups so as to output beam information corresponding to the selected audio beams. Here, the beam information are used by the speech recognizer 140 of FIG. 1 in a speech recognition and for determining a voice direction. The detailed hardware and operation in FIG. 7 have been disclosed in the above embodiment.

After the audio processing system of the present embodiment is powered on, a driver configures related information, such as the number of microphones and the number of beams, according to a specific application scenario, and simultaneously configures time delay estimation (TDE) information corresponding to each beam for the beamforming device. Then, after the human voice is detected by the voice activity detector, information of each microphone channel is transmitted to the finite impulse response filter. The finite impulse response filter and the sample rate converter convert the microphone information into a designed sample rate, which is then processed by the echo canceller to cancel an audio echo interference of the device itself. The echo-cancelled data is then processed and formed into beams by the beamforming device through the speech enhancement. Then, the DOA detection device confirms the sound source and outputs the audio data and the direction information thereof. Lastly, the speech recognizer receives the audio data and the direction information of the sound source, and performs the speech recognition and determines the voice direction so as to output a speech recognition result.

In summary, according to the embodiments of the invention, the audio information are received from the microphones in the microphone array, subsequent operations of the audio processing system are activated when determining that the human voice is included in the microphone information, and multiple infinite impulse response operations are used in the subsequent operations to accurately obtain the voice source direction from the audio beams corresponding to the microphone information. The subsequent operations also include noise and echo cancellation for the microphone information and the speaker play information. In this way, the audio processing system can suppress noise and extract the pure sound source signal according to the above method, so as to improve the accuracy of the speech recognition. In addition, most of the audio processing system of this embodiment can be implemented by hardware, which does not occupy CPU resources while ensuring performance.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A detection device for audio direction orientation, comprising:
    a first filter, receiving a plurality of first audio beams and performing a first infinite impulse response operation on each of the first audio beams to generate a plurality of second audio beams;

an absolute value operator, coupled to the first filter, the absolute value operator performing an absolute value operation on amplitude of each of the second audio beams to generate a plurality of third audio beams;
a second filter, coupled to the absolute value operator, the second filter performing a second infinite impulse response operation on each of the third audio beams to smooth each of the third audio beams to generate a plurality of fourth audio beams; and
a direction of arrival (DOA) processor, coupled to the second filter, the DOA processor dividing the fourth audio beams into a plurality of audio beam groups, and selecting a selected audio beam from each of the audio beam groups according to energy of each of the fourth audio beams in each of the audio beam groups so as to output beam information corresponding to the selected audio beams, wherein the beam information are used in a speech recognition and for determining a voice direction.

2. The detection device for audio direction orientation according to claim 1, wherein each of the audio beam groups corresponds to a channel,
the beam information comprise output beam channel data of the channel and an output beam channel index of the channel, wherein the output beam channel data is used in the speech recognition to obtain at least one speech information, and the output beam channel index is used for determining a transmission direction corresponding to the at least one speech information.

3. The detection device for audio direction orientation according to claim 1, wherein the DOA processor selects an envelope of each of the fourth audio beams having the largest amplitude in each of the audio beam groups as the selected audio beam.

4. The detection device for audio direction orientation according to claim 1, wherein an order of the first infinite impulse response operation is greater than an order of the second infinite impulse response operation.

5. The detection device for audio direction orientation according to claim 1, wherein the first filter performs the first infinite impulse response operation on each of the first audio beams to select audio data in a human voice frequency band, and reduce an interference of noise in a non human voice frequency band based on speech information.

6. The detection device for audio direction orientation according to claim 1, wherein the absolute value operator performs the absolute value operation on amplitude of each of the second audio beams to reduce an operational complexity.

7. The detection device for audio direction orientation according to claim 1, wherein the second filter smoothes an envelope of each of the third audio beams to prevent the DOA processor from constantly selecting the adjacent fourth audio beam when selecting and determining the voice direction.

8. An audio processing system, comprising:
a noise cancellation device, receiving microphone information and speaker play information, and sequentially performing a filtering operation, a sample rate converting operation and an echo cancelling operation on the microphone information and the speaker play information to generate echo-cancelled audio data;
a beamforming device, coupled to the noise cancellation device to generate a plurality of first audio beams according to the echo-cancelled audio data;
a direction of arrival (DOA) detection device, receiving the first audio beams, sequentially performing a first infinite impulse response operation, an absolute value operation and a second infinite impulse response operation on the first audio beams to generate a plurality of processed audio beams, and selecting a part of the processed audio beams to generate a plurality of beam information, wherein the beam information correspond to at least one specific direction; and
a speech recognizer, coupled to the DOA detection device, the speech recognizer performs a speech recognition and determines a voice direction according to the beam information.

9. The audio processing system according to claim 8, wherein the DOA detection device comprises:
a first filter, receiving the first audio beams and performing the first infinite impulse response operation on each of the first audio beams to generate a plurality of second audio beams;
an absolute value operator, coupled to the first filter, the absolute value operator performing an absolute value operation on amplitude of each of the second audio beams to generate a plurality of third audio beams;
a second filter, coupled to the absolute value operator, the second filter performing the second infinite impulse response operation on each of the third audio beams to smooth each of the third audio beams to generate the processed audio beams; and
a direction of arrival (DOA) processor, coupled to the second filter, the DOA processor dividing the processed audio beams into a plurality of audio beam groups, and selecting a selected audio beam from each of the audio beam groups according to energy of each of the processed audio beams in each of the audio beam groups so as to output beam information corresponding to the selected audio beams, wherein the beam information are used in a speech recognition and for determining a voice direction.

10. The audio processing system according to claim 9, wherein each of the audio beam groups corresponds to a channel,
the beam information comprise output beam channel data of the channel and an output beam channel index of the channel, wherein the output beam channel data is used in the speech recognition to obtain at least one speech information, and the output beam channel index is used for determining a transmission direction corresponding to the at least one speech information.

11. The audio processing system according to claim 9, wherein the DOA processor selects an envelope of each of the processed audio beams having the largest amplitude in each of the audio beam groups as the selected audio beam.

12. The audio processing system according to claim 8, further comprising:
a microphone array, coupled to the noise cancellation device,
the microphone array comprising a plurality of microphones which are spatially separated, each of the microphones respectively generating audio information,
wherein the microphone information comprises the audio information of each of the microphones.

13. The audio processing system according to claim 12, further comprising:
a voice activity detector, coupled between the microphone array and the noise cancellation device,
the voice activity detector determining whether a human voice is included in the microphone information, activating the noise cancellation device when determining that the human voice is included in the microphone information, and transmitting the microphone information to the noise cancellation device for the audio processing system to perform the speech recognition and determine the voice direction.

14. The audio processing system according to claim 8, wherein the noise cancellation device comprises:
a first finite impulse response filter, receiving and then converting the microphone information into first audio data;
a first sample rate converter, coupled to the first finite impulse response filter, the first sample rate converter converting the first audio data into the first audio data conforming to a sample rate;
a second finite impulse response filter, receiving and then converting the speaker play information into second audio data;
a second sample rate converter, coupled to the second finite impulse response filter, the second sample rate converter converting the second audio data into the second audio data conforming to the sample rate; and
an echo canceller, coupled to the first sample rate converter and the second sample rate converter, and performing an echo cancellation on the first audio data according to the second audio data to generate the echo-cancelled audio data.

15. The audio processing system according to claim 14, further comprising:
an output buffer, wherein the first finite impulse response filter, the first sample rate converter, the second finite impulse response filter, the second sample rate converter, the echo canceller, the beamforming device, the DOA detection device and the speech recognizer share use of the output buffer.

16. The audio processing system according to claim 14, further comprising:
a multiplier, wherein the first finite impulse response filter, the first sample rate converter, the second finite impulse response filter, the second sample rate converter, the echo canceller, the beamforming device, the DOA detection device and the speech recognizer share use of the multiplier in a pipeline arrangement manner.

17. A detection method for audio direction orientation, comprising:
receiving a plurality of first audio beams and performing a first infinite impulse response operation on each of the first audio beams to generate a plurality of second audio beams;
performing an absolute value operation on amplitude of each of the second audio beams to generate a plurality of third audio beams;
performing a second infinite impulse response operation on each of the third audio beams to smooth each of the third audio beams to generate a plurality of fourth audio beams; and
dividing the fourth audio beams into a plurality of audio beam groups, and selecting a selected audio beam from each of the audio beam groups according to energy of each of the fourth audio beams in each of the audio beam groups so as to output beam information corresponding to the selected audio beams, wherein the beam information are used in a speech recognition and for determining a voice direction.

* * * * *